US006826612B1

(12) United States Patent
Bosloy et al.

(10) Patent No.: US 6,826,612 B1
(45) Date of Patent: Nov. 30, 2004

(54) METHOD AND APPARATUS FOR AN IMPROVED INTERNET GROUP MANAGEMENT PROTOCOL

(75) Inventors: Jonathan L. Bosloy, Kanata (CA); Francois Bessette, Gatineau (CA)

(73) Assignee: Alcatel Canada Inc., Kanata (CA)

( * ) Notice: Subject to any disclaimer, the term of this patent is extended or adjusted under 35 U.S.C. 154(b) by 0 days.

(21) Appl. No.: 09/469,034

(22) Filed: Dec. 21, 1999

(51) Int. Cl.$^7$ .......................... G06F 15/173; G06F 15/16
(52) U.S. Cl. ........................ 709/227; 709/229; 709/226
(58) Field of Search ................................ 709/201–207, 709/217–219, 226–229; 370/260, 389–392

(56) References Cited

U.S. PATENT DOCUMENTS

| | | | | |
|---|---|---|---|---|
| 5,574,934 A | * | 11/1996 | Mirashrafi et al. | 709/207 |
| 5,634,011 A | * | 5/1997 | Auerbach et al. | 370/390 |
| 5,687,167 A | * | 11/1997 | Bertin et al. | |
| 6,081,536 A | * | 6/2000 | Gorsuch et al. | |
| 6,101,180 A | * | 8/2000 | Donahue et al. | 709/203 |
| 6,104,871 A | * | 8/2000 | Badovinatz et al. | 709/205 |
| 6,119,163 A | * | 9/2000 | Monteiro et al. | 709/227 |
| 6,154,463 A | * | 11/2000 | Aggarwal et al. | |
| 6,160,812 A | * | 12/2000 | Bauman et al. | |
| 6,192,401 B1 | * | 2/2001 | Modiri et al. | 709/201 |
| 6,363,319 B1 | * | 3/2002 | Hsu | 709/241 |
| 6,392,705 B1 | * | 5/2002 | Chaddha | |
| 6,434,609 B1 | * | 8/2002 | Humphrey | 709/218 |

* cited by examiner

Primary Examiner—Rupal Dharia
Assistant Examiner—Quang Nguyen

(57) ABSTRACT

A method and apparatus for controlling multicast group subscriptions in a multicast distribution circuit is presented. When a router included in the multicast circuit receives notification to terminate support of a particular multicast group (group leave request), data flow with respect to that multicast group is initially maintained on the communication link coupling the router to the hosts. Queries are issued to hosts on the communication link to determine whether continued support of the particular group is desired by any hosts coupled to the communication link. If, while waiting for a positive response to the queries issued, a request to join an additional multicast group is received, bandwidth availability on the communication link is examined to determine if adequate bandwidth is available for supporting the newly requested group addition. If adequate bandwidth is available, the newly requested group is added to those groups supported on the communication link. However, if adequate bandwidth for support of the newly requested group is not available, one or more groups that are pending termination (group specific queries have been issued for these groups) are selected for early termination in order to make enough bandwidth available to support the newly requested group addition. The selection criteria utilized to determine the groups to be terminated may be based on a variety of parameters.

33 Claims, 4 Drawing Sheets

Group Table 70

| Channels | Type | Bandwidth Requirement |
|---|---|---|
| A | Video | 10 |
| B | Video | 10 |
| C | Video | 10 |
| D | Video | 15 |
| E | Audio | 3 |
| F | Audio | 3 |
| G | Text | 1 |
| H | Text | 2 |

| Selected Set 80 | | |
|---|---|---|
| A | Video | 10 |
| C | Video | 10 |
| E | Audio | 3 |
| G | Text | 1 |

| Membership Verification Set 90 | | |
|---|---|---|
| E | Audio | 3 |
| G | Text | 1 |

Figure 2.

| Selected Set 80 | | |
|---|---|---|
| B | Video | 10 |
| C | Video | 10 |
| E | Audio | 3 |
| G | Text | 1 |

| Membership Verification Set 90 | | |
|---|---|---|
| E | Audio | 3 |
| G | Text | 1 |

| Selected Set 80 | | |
|---|---|---|
| A | Video | 10 |
| B | Video | 10 |
| C | Video | 10 |

| Membership Verification Set 90 | | |
|---|---|---|
| A | Video | 10 |

US 6,826,612 B1

METHOD AND APPARATUS FOR AN IMPROVED INTERNET GROUP MANAGEMENT PROTOCOL

FIELD OF THE INVENTION

The invention relates generally to data communication, and more particularly to a method and apparatus for improved internet group management protocol communication.

BACKGROUND OF THE INVENTION

As data communication systems continue to evolve, the bandwidth capabilities of such communication systems continue to increase. As such, applications that require large amounts of bandwidth become increasingly feasible. One such application is the distribution of digital media services. Digital media services can provide video information such as television programs or movies, audio programs, and text based information streams.

Typically, the various types of digital media that may be provided are sourced from one or more information sources. These information sources are intended to provide the multimedia programming to a large number of users that have access to the information via one or more communication networks. Destination routers coupled to the communication network provide interfaces to end users, or subscribers.

Typically, multiple subscribers are coupled to a single communication link that is coupled to the router. This communication link is utilized for distribution of the program data streams, or channels, to the end users. The Internet Group Management Protocol (IGMP) has been developed by the Internet Engineering Task Force (IETF) as a standard that relates to the communication between the router and the subscriber, which is often referred to as a host. The communication between the router and the set of hosts coupled to a particular communication link is accomplished using point to multipoint multicast transmissions. IETF specifications rfc1112 "Host Extensions for IP Multicasting" and rfc2236 "Internet Group Management Protocol, Version 2" describe the use of the current IGMP standard in detail.

The IGMP protocol as currently defined by the IETF dictates how the multicast transmissions between the router and host are managed. Each of the hosts coupled to a router determines which of the potential multicast transmission groups, or channels, that it receives. When the communication link between the router and a plurality of hosts is shared by the plurality of hosts, bandwidth limitations on the communication link can require intelligent management of the multicast transmissions provided via the communication link. For example, if a number of users reside on a single communication link and the bandwidth limitations only allow for a limited number of multicast transmissions to be supported over the communication link, usage of the particular multicast transmissions by the plurality of hosts must be monitored to ensure that bandwidth is not wasted on multicast transmissions which none of the hosts are actively receiving or using.

The prior art IGMP standards deal with the inclusion or deletion of particular multicast transmissions, or groups, from the communication link in an inefficient manner that may reduce the overall functionality of the multicast system. In one prior art system corresponding to the original IGMP standard, a host could explicitly join a group (multicast transmission) but could not explicitly leave a group. Periodic queries issued by the router would inquire as to whether hosts coupled to the communication link were actively using particular groups. For example, if a periodic query asked if group A was being used by any hosts on the communication link resulted in no positive responses, group A could then be deleted in terms of being supported via the communication link. Unfortunately, the periodic queries often took a substantial amount of time in resolving whether or not a particular group required continued support. During this time, the bandwidth utilized to support the group that was to be deleted was essentially wasted. Such bandwidth considerations are especially important in bandwidth limited systems that broadcasting high data rate multicast groups.

The second version of IGMP allowed for hosts to send explicit messages indicating that a particular multicast group was no longer required. However, because multiple hosts on a particular communication link could be utilizing a particular group, group specific queries are utilized to determine if all of the hosts agree that the particular group could be omitted from support. Once again, the querying process can induce a significant delay between the time at which the message indicating that the group should be terminated was received and actual termination of support of that particular group. In high bandwidth applications, such as digital media distribution services (DMDS) that broadcast multiple video, audio, and text channels to a large number of users, the delay associated with terminating particular groups can have adverse consequences in that bandwidth that should be available is not available for the addition of subsequent groups. As such, the delay in obtaining data corresponding to a new group could be noticeable, and undesirable to the end user.

Another prior art system based on the second version of the IGMP protocol stops the data flow for a particular group immediately upon receiving a leave group message corresponding to that particular group. If the queries as to whether any other hosts desire the data for that group result in a positive response; the data flow for that group is resurrected. Although this technique immediately makes bandwidth available for the addition of subsequent channels, the data flow to hosts that wish to maintain receipt of the group which is immediately terminated can be interrupted, which may result in glitches in service or other unacceptable consequences.

Therefore, a need exists for a method and apparatus for supporting multicast group transmissions that efficiently adds and removes particular multicast groups from support while making efficient use of available bandwidth available on the communication link for transmission of the multicast groups.

BRIEF DESCRIPTION OF THE DRAWINGS

FIG. 2 illustrates a block diagram of various group classifications used in conjunction with the multicast distribution circuit of FIG. 1;

DETAILED DESCRIPTION OF A PREFERRED EMBODIMENT OF THE INVENTION

Generally, the present invention provides a method and apparatus for controlling multicast group subscriptions in a multicast distribution circuit. When a router included in the multicast circuit receives notification to terminate support of a particular multicast group (group leave request), data flow with respect to that multicast group is initially maintained on the communication link coupling the router to the hosts. Queries are issued to hosts on the communication link to determine whether continued support of the particular group is desired by any hosts coupled to the communication link. If, while waiting for a positive response to the queries issued, a request to join an additional multicast group is received, bandwidth availability on the communication link is examined to determine if adequate bandwidth is available for supporting the newly requested group addition. If adequate bandwidth is available, the newly requested group is added to those groups supported on the communication link. However, if adequate bandwidth for support of the newly requested group is not available, one or more groups that are pending termination (group specific queries have been issued for these groups) are selected for early termination in order to make enough bandwidth available to support the newly requested group addition. The selection criteria utilized to determine the groups to be terminated may be based on a variety of selection parameters. For example, the identity of the host requesting the addition of the new multicast group or the identity of the host requesting that support of the particular group be terminated. Other selection parameters may include prior usage characteristics corresponding to the groups, a best fit comparison that makes an amount of bandwidth available that is substantially similar to that required for support of the newly requested group, the time a group join or group leave request was received, the contents of the groups being joined or terminated, or an inherent prioritization scheme that prioritizes the various multicast groups in terms of their likelihood of termination.

By maintaining data flow with respect to groups for which requests to terminate support have been received, interruption of such data flow with respect to other hosts that do not wish to terminate support is eliminated. By intelligently determining when an adequate bandwidth is available for inclusion of newly requested groups, and only prematurely terminating selected termination groups that are pending termination when bandwidth requirements dictate, available bandwidth on the communication link to the plurality of hosts is efficiently utilized in a manner that minimizes interruptions or delays in receiving multicast groups by the hosts.

Figure 1:
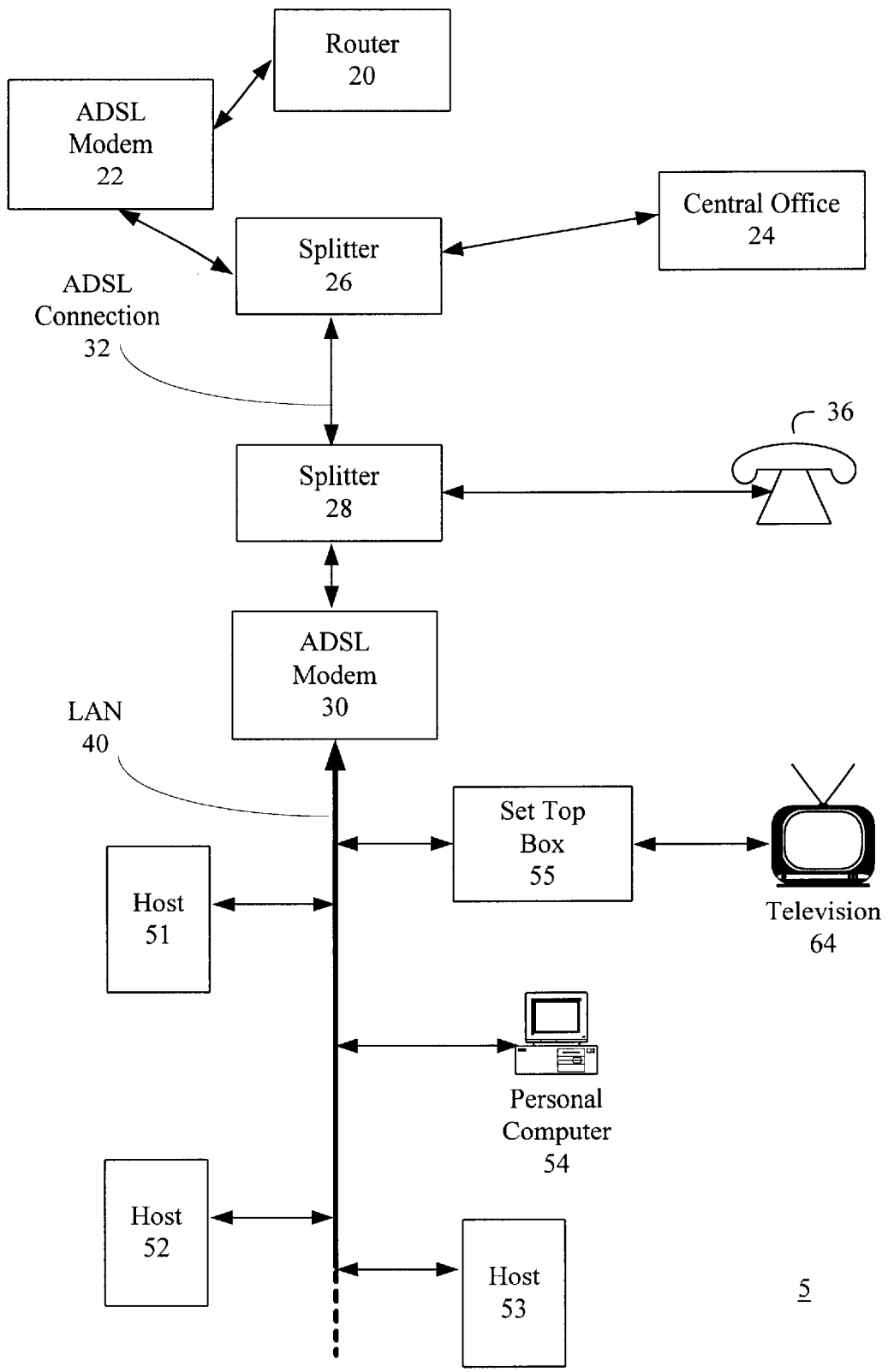
FIG. 1 illustrates a block diagram of a multicast distribution circuit in accordance with a particular embodiment of the present invention.

The invention can be better understood with reference to FIGS. 1–6. FIG. 1 illustrates a block diagram of a multicast distribution circuit 5 that includes an Asymmetrical Digital Subscriber Line (ADSL) connection 32 that provides multicast groups to a subscriber. A splitter 26 is coupled to an ADSL modem 22 that provides and receives data, such as the data for the multicast groups, and a central office 24 that provides and receives voice information or similar data. The splitter 26 combines and separates the data carried over the ADSL connection 32 depending on the direction of data flow.

A similar splitter 28 provides voice data service to a telephone 36 or similar apparatus and also provides a link between the ADSL modem 30 and the ADSL connection 32. The ADSL modem 30 is also coupled to a Local Area Network (LAN) 40 or similar network that allows a plurality of hosts 51–55 to interact with the ADSL modem 30 to receive the multicast group transmissions and make requests to receive or not receive particular multicast groups.

The ADSL modem 22 receives the multicast groups that it provides to the ADSL connection 32 via a router 20 that may be included in a communication network. The ADSL modem 22 may be coupled to a port of the router 20. One or more sources provide a plurality of multicast transmission groups (programming channels) to the network for distribution to a plurality of routers such as the router 20. The router 20 receives at least a portion of the plurality of multicast transmissions, and provides a selected set of this portion of the plurality of multicast transmissions to the plurality of hosts 51–55 via the communication link that includes the ADSL connection 32. Note that a router may have a plurality of communication links coupled to a plurality of ports such that a plurality of sets of hosts may be supported by a single router, where each set of hosts is serviced via a separate communication link.

The multicast transmissions provided to the plurality of hosts 51–55 may include multimedia type content, such as video programming, audio programming, and/or text information streams. Each of the hosts 51–55 may select to receive one or more of the multicast transmissions. As is illustrated, one of the hosts may be a set top box 55 that is coupled to the LAN 40. The set top box 55 can be used to provide multicast group transmissions to the television 64. The set top box 55 issues one or more requests to the router 20 via the communication link such that the set top box 55 receives the multicast transmissions corresponding to programming information required by users of the television 64. Thus, if a person watching the television 64 changes channels, the set top box 55 relays information concerning the channel change to the router 20. Essentially, the set top box 55 will indicate previously viewed channel is no longer required, and that a new multicast data stream corresponding to the channel to which the television user has now selected is required.

Similarly, one of the hosts may be a personal computer 54 as is illustrated. The personal computer, which is coupled to the LAN 40, may request multicast groups in a similar manner as the set top box 55. Each of the hosts 51–55 may be active or inactive at various points in time, and each of the hosts 51–55 may request one or more multicast groups when active.

In other embodiments, the communication link between the hosts and the router may be a broadband communication link such as an alternate digital subscriber line protocol (e.g. VDSL), Ethernet connection, local multipoint data service (LMDS), or a synchronous transfer mode (ATM) passive optical network (APON). Although such broadband interfaces typically have adequate bandwidth for supporting such applications, when a number of hosts 51–55 are tied to a shared communication link, the bandwidth limitations of the communication link may limit the number of multicast groups that can be supported over the communication link. As such, the router 20 must ensure that efficient use of the available bandwidth of the communication link occurs.

As described earlier, when a request to leave (terminate support of) a particular multicast group is received by the router 20, it is undesirable to immediately terminate data transmission along the communication link for that particular group. Therefore, the router 20 preferably issues group specific queries pertaining to the group prior to termination. These group specific queries enable any host coupled to the communication link to return a positive response indicating that termination of that particular group should not occur. If such a positive response is received, the router 20 will maintain support of the group such that other hosts that are utilizing data in that multicast group receive uninterrupted service.

When a group leave request is received from a host on the communication link and a group specific query is issued, the identity of the group to which the group specific query corresponds is added to a set of groups pending termination, which may be referred to as the membership verification set of groups. If a request to add a group to those groups supported on the communication link is received and inadequate bandwidth remains on the communication link to support the addition of the requested group, the membership verification set of groups is examined to select one or more termination groups that will be terminated before the group specific querying process for those particular groups has run to completion. The groups selected for termination are preferably selected in a manner that reduces the likelihood that additional hosts on the communication link will be adversely affected by the termination of the selected groups. This selection process is described in further detail below.

Once the groups to be terminated are selected, the router terminates support of these groups such that data corresponding to those groups is no longer provided via the communication link. As the bandwidth associated with the terminated groups is made available, the support of the requested group is initiated.

The technique for managing multicast groups disclosed herein is advantageous over prior art attempts inhabit it ensures that premature termination of a group does not occur unless bandwidth limitations force such termination. In addition, any premature termination of a particular group is based on some form of prioritization such that in many instances, groups terminated in order to increase available bandwidth are those groups that are unlikely to result in a degradation in service to any of the plurality of hosts 51–55 coupled to the communication link. Therefore, the method and apparatus provided herein provides for more efficient use of bandwidth in a multicast transmission system such that multimedia applications can be implemented in a more cost efficient and reliable manner.

Figures 3, 4, 5:
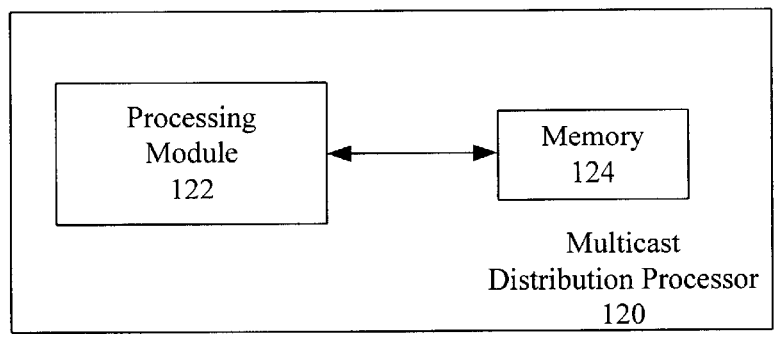
FIGS. 3 and 4 illustrate a portion of the group classifications of FIG. 2 at subsequent time intervals.
FIG. 5 illustrates a block diagram of a multicast distribution processor in accordance with a particular embodiment of the present invention.

FIGS. 2–4 illustrates various group classifications associated with the technique for multicast group management described in the discussion of FIG. 1. The example system illustrated in FIGS. 2–4 is greatly simplified in order to promote understanding of the general concepts of the multicast group subscription management technique. The group table 70 of FIG. 2 illustrates a plurality of multicast groups, or channels, and their associated data types and bandwidth requirements. Note that no units are included in the bandwidth requirement, and the numbers indicated in the group table 70 are merely for illustrative purposes, and are not necessarily representative of any particular system. The group table 70 indicates that a plurality of video channels A–D, a plurality of audio channels E and F, and a plurality of text channels G and H are available to hosts 51–55 via the network. Note that the bandwidth requirements for the video channels are shown to be significantly greater than those for the audio and text channels.

Assuming that the communication link is only capable of delivering 30 units of bandwidth to the hosts 51–55 at any one time, the number of channels included in the group table 70 that can be supported on the communication link at any one time is limited. As such, transitions concerning support of various channels must be performed in an efficient and timely manner in order to ensure that the hosts 51–55 receive reliable and prompt service.

At a particular point in time, the selected set 80 indicates the multicast groups that are supported, over the communication link. The selected set 80 as illustrated in FIG. 2 indicates that video channels A and C, audio channel E, and text channel G are supported at this particular point in time. The total bandwidth requirements of these channels is 24 bandwidth units. Note that this is within the bandwidth capabilities (30 units) of the communication link.

The membership verification set 90 indicates that group leave requests corresponding to audio channel E and text channel G have been received. As such, group specific queries corresponding to these two channels pending termination have been issued. However, because they are still included in the membership verification set, no positive response has yet been received from the group specific queries. The presence of the channels in the membership verification set 90 also indicates that the querying procedure for the channels has not yet been exhausted, for if it had been, the support of these groups would simply have terminated and they would be absent from both the selected set 80 and the membership verification set 90.

Thus, the selected set 80 and the membership verification set 90 of FIG. 2 illustrate the state of the system in FIG. 1 at a particular point in time. If subsequent to that point in time, a leave group, or group termination request is received for channel A, channel A will be added to the membership verification set 90, and a group specific query corresponding to group A will be issued. If, prior to receipt of a positive response to the group specific query with respect to channel A, a group membership report is received from a host coupled to the communication link requesting that channel B be added to the selected set 80, a bandwidth limitation is encountered. Group A has not yet been terminated, nor have groups E and G. As such, support of channel B in addition to the channels currently included in the selected set 80 of FIG. 2 would require 34 bandwidth units on the communication link. As indicated earlier, in this particular example only 30 bandwidth units are available over the communication link. Therefore, in order to add support for channel B, one or more channels in the membership verification set 90 (which now also includes channel A) must be terminated prior to expiration of their querying processes.

As stated earlier, the choice of channels to terminate prematurely may be based on a number of different factors. These factors may include identity of the host requesting that support of the particular channel be terminated, a best fit comparison between the additional bandwidth required to support the channel to be added and the bandwidth of the particular channels included in the membership verification set, a prioritization scheme that prioritizes the channels based on factors which may include previous usage characteristics, program content, etc.

In one example, channel A is selected as the termination group. The cause of the selection of channel A may be that the host 51 is the source of both the termination request with respect to channel A and the add channel request with respect to channel B. This may correspond to a simple channel change performed by the user of the television set 64. Noting that the requests to drop channel A and the request to add channel B were sourced from the same host may provide an indication that a simple channel change has occurred. As such, prematurely dropping channel A is a reasonable choice that may not have any consequences with respect to other hosts. As such, channel A may be preferentially selected as the termination group.

Another reason that channel A may be chosen as the termination group is that it is the only video channel currently residing in the membership verification set. Therefore, the content of the channel selected as the termination group may be matched with the content of the group to be added. In either case, when channel B is added, and channel A is prematurely terminated, the resulting selected set 80 and membership verification set 90 are shown in FIG. 3, which represents the classification of the various channels at a time sequence subsequent to that illustrated in FIG. 2. As can be seen, channel B is now included in the selected set 80 which is supported. Channels E and G remain in the membership verification set 90, as they have not yet been terminated.

In another example, channels E and G may be selected as the channels to prematurely terminate. This corresponds to a "best fit" bandwidth comparison, where it can be observed that termination of channels E and G will make just enough bandwidth available to enable channel B to be included in the selected set 80. The resulting selected set 80 and membership verification set 90 corresponding to this example are illustrated in FIG. 4. Note that the selected set 80 now includes channels A, B and C, which total 30 bandwidth units which is within the limitations of the communication link. The membership verification set 90 only includes the channel A, as channels E and G have been terminated.

Once again, it is emphasized that the example illustrated using FIGS. 1–4 is a greatly simplified example. However, the general principles applied with respect to the examples given are applicable in more complex systems that include many more hosts, many more channels, and a wider variety of multicast group types that may be supported. What is emphasized is that premature termination of support of any particular multicast group, or channel, does not occur until bandwidth limitations become a limiting factor on the provision of channels to the hosts within the system. When bandwidth limitations do become a factor, intelligent decisions as to which channels to eliminate from the selected set supported are utilized to determine how the limited bandwidth available is most efficiently utilized. Thus, the modifications to the IGMP protocols described herein provide a technique to maximize effective bandwidth usage over limited resources.

FIG. 5 illustrates a multicast distribution processor 120 that may be included in a router in a multicast distribution circuit such as that illustrated in FIG. 1. The multicast distribution processor 130 may be used to perform the method, or a portion of the method, illustrated in FIG. 6 that describes, a method for controlling multicast groups subscriptions. The multicast distribution processor 120 includes a processing module 122 and memory 124. The processing module 122 may be a single processing device or a plurality of processing devices. Such a processing device may be a microprocessor, microcontroller, digital signal processor, microcomputer, state machine, logic circuitry, or any device that processes information based on operational or programming instructions.

The memory 124 may be a single memory device or a plurality of memory devices. Such a memory device may include a read only memory device, random access memory device, floppy disk, hard drive memory, or any device that stores digital information. Note that when the processing module 122 has one or more of its functions performed by a state machine or logic circuitry, the memory containing the corresponding operational instructions is embedded within the state machine or logic circuitry.

Figure 6:
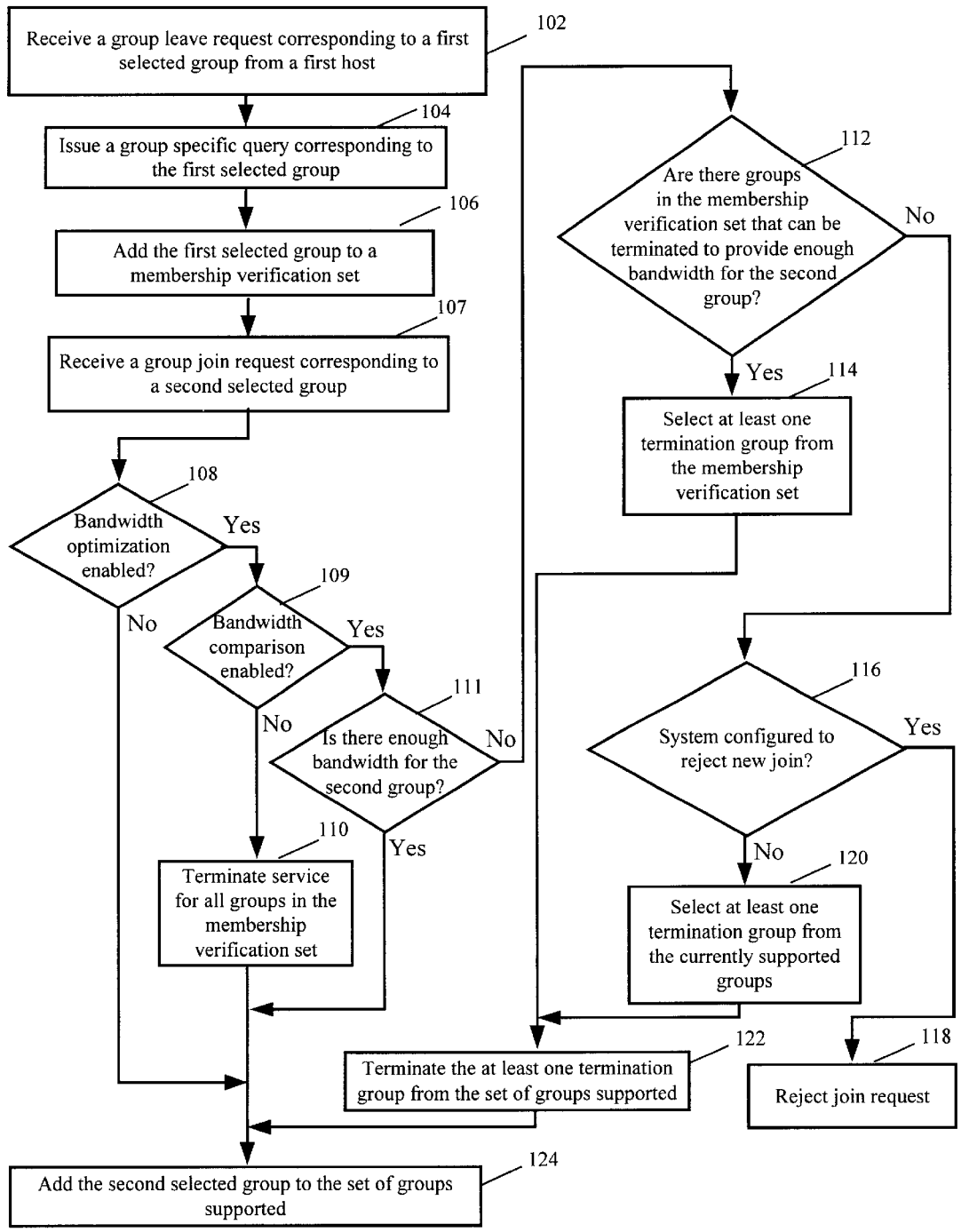
FIG. 6 illustrates a flow diagram of a method for controlling multicast group subscriptions in accordance with a particular embodiment of the present invention.

The memory 124 stores programming or operational instructions that, when executed by the processing module 122, cause the processing module 122 to perform at least a portion of the steps of the method illustrated in FIG. 6. Note that the multicast distribution processor 120 may implement some of the functions of the method of FIG. 6 through the use of software stored in the memory 124, whereas other portions of the method of FIG. 6 may be implemented using hardware or circuitry included within the multicast distribution processor 120. Thus, in some embodiments, a mix of hardware and software may be used to perform the method illustrated in FIG. 6.

FIG. 6 illustrates a method for controlling multicast groups subscriptions. The multicast groups associated with the method of FIG. 6 may include groups such as video programming information, audio programming information and text programming information. The video programming information may be encoded in a video encoding format such as the MPEG standard. The method of FIG. 6 may be used in a router that utilizes a communication link of limited bandwidth to provide the multicast groups, or channels, to a plurality of hosts.

The method of FIG. 6 begins at step 102 where a group leave request is received from a first host of the plurality of hosts supported. The group leave request received at step 102 corresponds to a first selected group of a plurality of multicast groups, where the first host is included in a set of hosts supported along a connection. Such a connection may be maintained across the communication link of limited bandwidth as described earlier. At step 104, a group specific query corresponding to the first selected group is issued to the set of hosts on the connection.

Typically, the group specific query includes a response time parameter. The response time parameter included in the group specific query determines a time period after issuance of the group specific query in which a host response is accepted. Thus, the response time parameter dictates to the hosts the time period within which they may respond to request that termination of support of a particular channel does not occur.

A query interval parameter, or timer, determines temporal spacing between group specific queries when a plurality of group specific queries are issued in response to the group leave request. Thus, the initial group specific query will be issued a short time after the group leave request is received. The query interval parameter determines when a subsequent group specific query will be issued assuming that a positive response is not received to the initial group specific query before that time.

In prior art IGMP systems, the group specific query interval parameter and the group specific response time parameter were combined in a single "Last Member Query Interval" parameter that allowed hosts to respond at any time between group specific queries. For example, in such prior art systems, if the spacing between group specific queries was one second, a host could respond at any time within that one-second period and request that support of the group pending termination be maintained. In such an example, the time at which a host provided such a response was based on a pseudo-random delay within a range of 0–1 second. During this time period, group join requests may be received that could result in premature termination of the group for which group specific query has been issued. Therefore, allowing hosts a long response period can result in temporary termination of groups that is undesirable. Although faster responses can be solicited from the hosts by setting the "Last Member Query Interval" to a smaller interval, this results in group specific queries being generated much more frequently than is appropriate.

By separating the "Last Member Query Interval" of prior art IGMP systems into independently configured query interval and response time parameters, responses from hosts can be forced to occur within a much shorter time period after issuance of a group specific query. For example, the query interval parameter may be set at one second, while the response time parameter is set to one-tenth of a second. This would force hosts to respond within one-tenth of a second while maintaining the temporal spacing of group specific queries to a reasonable level.

In order to ensure that group leave requests are not lost in transit resulting in continued support of unwanted groups, when a host issues a group leave request, the host may start a timer or record a time stamp corresponding to the time the group leave request was issued. If a group specific query corresponding to the group leave request is not received by the host within a selected time period, an additional group leave request may be issued. The selected time period may be configured based on a time period parameter setting. Issuance of additional group leave requests may be repeated a number of times up to a maximum number determined by an additional group leave request parameter that can be configured to suit the needs of the particular system in which the method is employed.

At step 106, the first selected group is added to a membership verification set of groups as a result of the issuance of the group specific query. The membership verification set of groups includes groups of the plurality of multicast groups that have currently issued groups specific queries. Thus, groups included in the membership verification set of groups are groups that are pending termination, and which will be terminated if their querying processes expire before appositive response to a corresponding group specific query is received.

While waiting for a positive response for the group specific query issued in response to the group leave request from the first host, group join requests (membership reports) may be received. At step 107, a group join request corresponding to a second selected group of the plurality of multicast groups is received via a membership report from a second host of the set of hosts. In some embodiments, processing of group join requests after issuance of a group specific query may be delayed by a predetermined time period in order to allow hosts to respond to the group specific query. This delay prevents interruption of service to hosts when a number of hosts are receiving the same multicast channel and one of those hosts requests a new channel very quickly after sending a group leave request corresponding to the multicast channel, which might occur in a channel changing scenario. The predetermined time period during which processing of group join requests may be configurable to suit the needs of a particular multicast system. Note that the predetermined time period may be based on the response time parameter in the system in order to limit the delay incurred in processing group join requests. If no response is received to the group specific query during the predetermined time period during which processing of any received group join requests is delayed, such join requests are processed once the predetermined time period has expired. At step 108, it is determined if bandwidth optimization is enabled. The inclusion of step 108 allows the optimization features described herein to be enabled or disabled. If bandwidth optimization is disabled, the method proceeds to step 124 and normal IGMP processing is followed. If bandwidth optimization is determined to be enabled at step 108, the method proceeds to step 109 where it is determined if bandwidth comparison is enabled. If it is not, the method proceeds to step 110 where service for all of the groups in the membership verification set is terminated prior to adding service for the second selected group at step 124.

Thus, in one embodiment of the invention, all of the groups included in the membership verification set of groups may simply be terminated or disconnected when a new group join request is received. This provides a simple and easy to implement technique that only terminates groups prematurely when a join request is received. Enabling bandwidth comparison allows for selective termination of groups to enable join requests to be serviced, which further enhances the efficiency with which the available bandwidth is utilized. If bandwidth comparison is determined to be enabled at step 109, the method proceeds to step 111.

At step 111 it is determined whether or not there is adequate bandwidth to support the second selected group without terminating any currently supported groups. If it is determined at step 111 that adequate bandwidth is available for supporting the second selected group, the method proceeds to step 124 where the second group is added to the set of groups supported along the connection.

If it is determined at step 111 that adequate bandwidth for supporting the second selected group is not currently available, the method proceeds to step 112. At step 112 it is determined if there are groups in the membership verification set that can be terminated to provide enough bandwidth for the second selected group to be added. If there are groups in the membership verification set that can be terminated in order to make enough bandwidth available, the method proceeds to step 114. Otherwise, the method proceeds to step 116.

At step 114, at least one termination group is selected from the membership verification set of groups. As was described earlier with respect to FIGS. 1–4, the selection of the group, or groups to be terminated may be based on host identities corresponding to group leave requests that caused groups to be included in the membership verification set of groups, a best fit comparison between bandwidth usage of groups in the membership verification set of groups and the bandwidth requirements of the second selected group, or some other type of prioritization scheme that prioritizes groups in the membership verification set of groups based on parameters such as group data content, previous usage characteristics, etc. An example prioritization scheme may maintain time stamp data for when a group is added to the membership verification set such that those that have been there the longest are terminated first. If hosts are provided with a short time in which to respond to group specific queries, this example prioritization scheme is further enhanced. In another embodiment selection of the at least one termination group includes selecting a particular group included in the membership verification set that was placed in the membership verification set due to a group leave request issued by a particular host which also issued a group join request that initiated support of the particular group by the connection. Thus, if a host request to join a new group and has also requested to leave another group, the group that that host has requested to leave may be selected as the termination group. After step 114, the method proceeds to step 122.

At step 116, it is determined if the system is configured reject join requests when adequate bandwidth cannot be made available through the termination of groups in the membership verification set. This may be determined via a configuration parameter that makes this a configurable option in the system. If the configuration parameter indicates that such join request should not be acted upon when the bandwidth cannot be made available through the termination of groups in the membership verification set, the method proceeds to step 118 where the join request is rejected. Rejection of the join request may or may not include notifying the host that issued the join request, and such notification to the host may include an indication that the request was rejected because bandwidth was not available. In other embodiments, join requests that may not be serviced immediately because of lack of bandwidth may be queued such that they can be processed at a subsequent point in time when adequate bandwidth becomes available.

Note that the method may not include this configuration parameter such that the option to reject join requests may be fixed in one state or the other. Thus, a simplified version of the method illustrated may not include a step such as step 116 and would instead include one of the two possible paths that can be taken based on the determination performed at step 116.

If the system is configured such that new join requests are not rejected, the method proceeds from step 116 to 120. At step 120, at least one termination group is selected from the set of groups that are currently being supported. Thus, even though a group is not pending termination (is not included in the membership verification set) it may be selected for termination. If there are some groups included in the membership verification set that will provide some bandwidth if terminated (but not enough to support the second group), these groups may be selected as termination groups at step 114 along with at least one group not in the membership verification set. Thus, enough groups are selected as termination groups at step 120 such that when they are terminated, adequate bandwidth will be available for the second selected group.

The selection of termination groups at step 120 may be advantageous as it relies on recent host requests to determine which groups are supported. In the case where a group leave request corresponding to a currently supported group is lost, enabling the termination of groups not included in the membership verification set ensures that group join requests will not be rejected while the group that should have been terminated is allowed to continue to consume bandwidth. As was described above with respect to step 114, the selection of the group, or groups to be terminated may be based on a variety of selection parameters. After step 120, the method proceeds to step 122.

At step 122, the termination groups selected at either step 112 or 120 are terminated. Termination of a group implies that support of the group over the connection no longer exists. As such, the bandwidth utilized by these groups that have now been terminated is made available. Because the groups for termination were selected such that an adequate amount of bandwidth would be available for supporting the second selected group, the method can proceed to step 124 where the second selected group is added to the set of groups supported by the particular connection.

By utilizing the method of FIG. 6, the control of multicast group subscriptions in a multicast distribution circuit can be performed in a manner that maximizes the efficient use of the bandwidth available in the system. Such a method is advantageous over prior art systems in that it does not require premature termination of groups, or channels, pending termination unless the bandwidth limitations of the system so dictate. When premature termination of one or more groups is required, those groups are selected based on a prioritization scheme that ensures that adequate bandwidth is made available while attempting to minimize any adverse effects resulting from the premature termination of certain groups.

It should be understood that the implementation of variations and modifications of the invention in its various aspects should be apparent to those of ordinary skill in the art, and that the invention is not limited to the specific embodiments described. It is therefore contemplated to cover by the present invention any and all modifications, variations, or equivalents that fall within the spirit and scope of the basic underlying principles disclosed and claimed herein.

What is claimed is:

1. A method for controlling multicast group subscriptions, comprising:

receiving a group leave request from a first host, wherein the group leave request corresponds to a first selected group of a plurality of multicast groups, wherein the first host is included in a set of hosts supported along a connection;

issuing at least one group specific query to the set of hosts, wherein the at least one group specific query corresponds to the first selected group, wherein the first selected group is added to a membership verification set of groups as a result of the at least one group specific query, wherein the membership verification set of groups includes groups of the plurality of multicast groups that have currently issued group specific queries;

while waiting for a response to the at least one group specific query:

receiving a group join request from a second host in the set of hosts, wherein the group join request corresponds to a second selected group of the plurality of multicast groups;

when bandwidth along the connection is available to support bandwidth requirements of the second selected group, adding the second selected group to a set of groups supported by the connection; and when bandwidth along the connection is not available to support the bandwidth requirements of the second selected group:

selecting at least one termination group from the membership verification set of groups;

terminating support of the at least one termination group such that available bandwidth along the connection is increased to meet the bandwidth requirements of the second selected group, wherein terminating support of the at least one termination group removes the at least one termination group from the set of groups supported by the connection; and adding the second selected group to the set of groups supported by the connection.

2. The method of claim 1, wherein receiving a group join request further comprises delaying processing of the group join request for a predetermined time period following issuance of a first group specific query.

3. The method of claim 1, wherein selecting the at least one termination group further comprises selecting the at least one termination group based on host identities of group leave requests corresponding to groups in the membership verification set of groups.

4. The method of claim 3, wherein when identity of the first host matches identity of the second host, the first selected group is preferentially selected as a termination group.

5. The method of claim 1, wherein selection of the at least one termination group includes selecting a particular group included in the membership verification set that was placed in the membership verification set due to a group leave request issued by a particular host which also issued a group join request that initiated support of the particular group by the connection.

6. The method of claim 1, wherein selecting the at least one termination group further comprises selecting the at least one termination group based on a best fit comparison between bandwidth usage of groups in the membership verification set of groups and the bandwidth requirements of the second selected group.

7. The method of claim 1, wherein selecting the at least one termination group further comprises selecting the at least one termination group based on a prioritization scheme that prioritizes groups in the membership verification set of groups for termination.

8. The method of claim 7, wherein the prioritization scheme is configured based on previous usage characteristics of each of the plurality of multicast groups.

9. The method of claim 7, wherein the prioritization scheme is configured based on data content included in each of the plurality of multicast groups.

10. The method of claim 1, wherein selecting the at least one termination group further comprises selecting the at least one termination group based on duration of time spent by each group in the membership verification set.

11. The method of claim 1, wherein selecting the at least one termination group further comprises selecting all of the groups included in the membership verification set of groups as termination groups.

12. The method of claim 1, wherein each group specific query includes a response time parameter, wherein the response time parameter determines a time period after issuance of the group specific query within which a host response is accepted, wherein a query interval parameter determines temporal spacing between group specific queries when a plurality of group specific queries are issued in response to the group leave request.

13. The method of claim 1, wherein data streams associated with at least a portion of the plurality of multicast groups include video data.

14. The method of claim 13, wherein data streams associated with at least a portion of the plurality of multicast groups include MPEG data.

15. A multicast distribution circuit, comprising:
a communication link;
a plurality of hosts operably coupled to the communication link; and
a router that includes a port, wherein the port is operably coupled to the communication link, wherein the router receives data corresponding to a plurality of multicast groups and provides a selected set of the plurality of multicast groups to the plurality of hosts via the communication link,
wherein, when a first host of the plurality of hosts issues a group leave request corresponding to a first selected group in the selected set, the router adds the first selected group to a set of groups pending termination and issues at least one group specific query to the plurality of hosts, wherein while the router is waiting for a response to the at least one group specific query, when a second host of the plurality of hosts issues a group join request that corresponds to a second selected group of the plurality of multicast groups and available bandwidth of the communication link cannot support bandwidth requirements of the second selected group, the router selects at least one termination group from the set of groups pending termination, wherein the at least one termination group is removed from the selected set such that the available bandwidth of the communication link is increased to meet the bandwidth requirements of the second selected group, wherein when the available bandwidth of the communication link can support the second selected multicast group, the second selected multicast group is added to the selected set.

16. The circuit of claim 15 wherein the circuit further comprises a plurality of communication links, wherein each of the plurality of communication links is operably coupled to a corresponding port on the router, wherein the router provides each of the communication links with a corresponding selected set of the plurality of multicast groups via a corresponding one of the communication links, wherein each of the plurality of communication links is operably coupled to a corresponding plurality of hosts, wherein for each communication link:
when a first host of the plurality of hosts coupled to the communication link issues a group leave request corresponding to a first selected group in the selected set, the router adds the first selected group to a set of groups pending termination corresponding to the communication link and issues at least one group specific query to the corresponding plurality of hosts coupled to the communication link, wherein while the router is waiting for a response to the at least one group specific query, when a second host of the corresponding plurality of hosts' coupled to the communication link issues a group join request corresponding to a second selected group of the plurality of multicast groups and available bandwidth of the communication link cannot support bandwidth requirements of the second selected group, the router selects at least one termination group from the set of groups pending termination corresponding to the communication link, wherein the at least one termination group is removed from the corresponding selected set for the communication link such that the available bandwidth of the communication link is increased to meet the bandwidth requirements of the second selected group, wherein when the available bandwidth of the communication link can support the second selected multicast group, the second selected multicast group is added to the corresponding selected set for the communication link.

17. The circuit of claim 15 further comprises a group selection block operably coupled to the router, wherein the group selection block stores a set of identities of groups of the plurality of multicast groups accessible to the plurality of hosts on the communication link, wherein addition of the second selected group to the selected set is conditioned upon inclusion of the second selected group in the set of identities.

18. The circuit of claim 15, wherein the circuit is included in a system that includes a plurality of additional similar circuits operably coupled to a network, wherein data for each of the plurality of multicast groups is transmitted across the network to routers included in each of the plurality of additional similar circuits from at least one source.

19. The circuit of claim 15, wherein data for at least a portion of the multicast groups includes video data.

20. The circuit of claim 19, wherein the video data is MPEG encoded video data.

21. The circuit of claim 15, wherein when identity of the first host matches identity of the second host, the router preferentially selects the first selected group as a termination group.

22. The circuit of claim 15, wherein the router delays processing of the group join request for a predetermined time period after issuing a first group specific query corresponding to the group leave request for the first selected group.

23. The circuit of claim 15, wherein the router selects the at least one termination group based on a best fit comparison between bandwidth usage of groups in the set of groups pending termination and the bandwidth requirements of the second selected group.

24. The circuit of claim 15, wherein the router issues group specific queries to the plurality of hosts such that the group specific query includes a response time parameter in which a host response is accepted, and wherein group specific queries are temporally spaced based on a query interval timer.

25. A multicast distribution processor, comprising:
a processing module; and
memory operably coupled to the processing module, wherein the memory stores operating instructions that, when executed by the processing module, cause the processing module to perform a set of functions that includes:
receiving a group leave request from a first host, wherein the group leave request corresponds to a first selected group of a plurality of multicast groups, wherein the first host is included in a set of hosts supported along a connection;
issuing at least one group specific query to the set of hosts, wherein the at least one group specific query corresponds to the first selected group, wherein the first selected group is added to a membership verification set of groups as a result of the at least one group specific query, wherein the membership verification set of groups includes groups of the plurality of multicast groups that have currently issued group specific queries;

while waiting for a response to the at least one group specific query:

receiving a group join request from a second host in the set of hosts, wherein the group join request corresponds to a second selected group of the plurality of multicast groups;

when bandwidth along the connection is available to support bandwidth requirements of the second selected group, adding the second selected group to a set of groups supported by the connection;

when bandwidth along the connection is not available to support the bandwidth requirements of the second selected group:

selecting at least one termination group from the membership verification set of groups;

terminating support of the at least one termination group such that available bandwidth along the connection is increased to meet the bandwidth requirements of the second selected group, wherein terminating support of the at least one termination group removes the at least one termination group from the set of groups supported by the connection; and adding the second selected group to the set of groups supported by the connection.

26. A method for controlling multicast group subscriptions, comprising:

receiving a group join request that corresponds to a selected group of a plurality of multicast groups;

when bandwidth along a connection is available to support bandwidth requirements of the selected group, adding the selected group to a set of groups supported by the connection;

when bandwidth along the connection is not available to support the bandwidth requirements of the selected group:

when a membership verification set of groups, which includes groups pending termination, includes groups pending termination that, if terminated, would enable the connection to support the bandwidth requirements of the selected group, terminating at least a portion of the groups pending termination such that adequate bandwidth is made available on the connection to meet the bandwidth requirements of the selected group; and adding the selected group to the set of groups supported by the connection.

27. The method of claim 26 further comprises, when the membership verification set of groups does not include groups that, if terminated, would enable the connection to support the bandwidth requirements of the selected group, rejecting the group join request when a configuration parameter indicates that group join requests can be rejected.

28. The method of claim 26 further comprises, when the membership verification set of groups does not include groups that, if terminated, would enable the connection to support the bandwidth requirements of the selected group, queuing the group join request for subsequent servicing when bandwidth becomes available.

29. The method of claim 26 further comprises, when the membership verification set of groups does not include groups that, if terminated, would enable the connection to support the bandwidth requirements of the selected group:

selecting at least one termination group from the set of groups supported by the connection that is not included in the membership verification set of groups;

terminating the at least one termination group and groups included in the membership verification set of groups such that adequate bandwidth is made available on the connection to meet the bandwidth requirements of the selected group; and adding the selected group to the set of groups supported by the connection.

30. A method for requesting termination of support of a group in a multicast system, comprising:

issuing a group leave request corresponding to the group to a router that controls support of groups in the multicast system;

determining if a group specific query is issued within a selected time period by the router in response to the group leave request; and when it is determined that the group specific query has not been issued within the selected time period, issuing an additional group leave request corresponding to the group.

31. The method of claim 30, wherein the selected time period is determined based on a time period parameter setting.

32. The method of claim 30 further comprises continuing to periodically issue additional group leave requests until a group specific query is received in response to one of the group leave requests.

33. The method of claim 32, wherein a maximum number of additional group leave requests is determined based on an additional group leave request parameter setting.

* * * * *